(12) United States Patent
Zeiger et al.

(10) Patent No.: US 10,988,418 B2
(45) Date of Patent: Apr. 27, 2021

(54) COPPER-CERAMIC SUBSTRATE, COPPER PRECURSOR FOR PRODUCING A COPPER-CERAMIC SUBSTRATE AND PROCESS FOR PRODUCING A COPPER-CERAMIC SUBSTRATE

(71) Applicant: AURUBIS STOLBERG GMBH & CO. KG, Stolberg (DE)

(72) Inventors: Karl Zeiger, Eschweiler (DE);
Benjamin Cappi, Neu-Moresnet (BE);
Helge Lehmann, Hürtgenwald (DE);
Robert Koch, Stolberg (DE)

(73) Assignee: AURUBIS STOLBERG GMBH & CO. KG, Stolberg (DE)

( * ) Notice: Subject to any disclaimer, the term of this patent is extended or adjusted under 35 U.S.C. 154(b) by 212 days.

(21) Appl. No.: 16/060,344

(22) PCT Filed: Dec. 6, 2016

(86) PCT No.: PCT/EP2016/079879
§ 371 (c)(1),
(2) Date: Jun. 7, 2018

(87) PCT Pub. No.: WO2017/097758
PCT Pub. Date: Jun. 15, 2017

(65) Prior Publication Data
US 2019/0002358 A1    Jan. 3, 2019

(30) Foreign Application Priority Data
Dec. 7, 2015  (DE) .................. 10 2015 224 464.4

(51) Int. Cl.
*B32B 7/00*    (2019.01)
*B23K 35/00*   (2006.01)
(Continued)

(52) U.S. Cl.
CPC .......... *C04B 37/021* (2013.01); *B23K 35/302* (2013.01); *B32B 7/02* (2013.01);
(Continued)

(58) Field of Classification Search
CPC .............. C04B 37/021; C04B 2237/55; C04B 2237/32; C04B 2237/407; C04B 2237/54;
(Continued)

(56) References Cited

U.S. PATENT DOCUMENTS 3,226,822 A * 1/1966 Budde .................. C04B 41/89
228/122.1
4,624,404 A * 11/1986 Ohmae ................. C04B 37/026
228/198

(Continued)

FOREIGN PATENT DOCUMENTS

CN    102348835    11/1999
CN    102030565    4/2011
(Continued)

OTHER PUBLICATIONS

Examination Report from German Patent Office for Application No. 10 2015 224 464.4, dated Aug. 10, 2016, pp. 1-5.
(Continued)

*Primary Examiner* — Kiley S Stoner
(74) *Attorney, Agent, or Firm* — Saliwanchik, Lloyd & Eisenschenk

(57) ABSTRACT

The present invention relates to a copper ceramic substrate incorporating a ceramic carrier, and a copper layer joined to a surface of the ceramic carrier, wherein the copper layer incorporates at least one first layer, which faces the ceramic carrier and has an average first grain size, and a second layer, which is arranged on the face of the copper layer facing (Continued)

away from the ceramic carrier and has an average second grain size, the second grain size being smaller than the first grain size.

10 Claims, 2 Drawing Sheets

(51) Int. Cl.

| | | |
|---|---|---|
| *C04B 37/02* | (2006.01) | |
| *B32B 7/02* | (2019.01) | |
| *B32B 9/00* | (2006.01) | |
| *B32B 9/04* | (2006.01) | |
| *B32B 15/01* | (2006.01) | |
| *B32B 15/04* | (2006.01) | |
| *B32B 7/08* | (2019.01) | |
| *B32B 7/12* | (2006.01) | |
| *B23K 35/30* | (2006.01) | |
| *B23K 103/16* | (2006.01) | |

(52) U.S. Cl.
CPC .............. *B32B 7/08* (2013.01); *B32B 7/12* (2013.01); *B32B 9/005* (2013.01); *B32B 9/041* (2013.01); *B32B 15/01* (2013.01); *B32B 15/043* (2013.01); *B23K 2103/172* (2018.08); *B32B 2250/05* (2013.01); *B32B 2250/40* (2013.01); *B32B 2307/202* (2013.01); *B32B 2307/206* (2013.01); *B32B 2307/30* (2013.01); *B32B 2307/308* (2013.01); *B32B 2307/40* (2013.01); *B32B 2307/536* (2013.01); *B32B 2307/538* (2013.01); *B32B 2307/54* (2013.01); *B32B 2307/732* (2013.01); *B32B 2457/00* (2013.01); *C04B 2237/32* (2013.01); *C04B 2237/407* (2013.01); *C04B 2237/54* (2013.01); *C04B 2237/55* (2013.01); *C04B 2237/588* (2013.01); *C04B 2237/706* (2013.01); *C04B 2237/86* (2013.01)

(58) Field of Classification Search
CPC ........ C04B 2237/588; C04B 2237/706; C04B 2237/86; B32B 15/01; B32B 15/043; B32B 7/08; B32B 7/12; B32B 7/02; B32B 9/005; B32B 9/041; B32B 2307/206; B32B 2307/40; B32B 2307/202; B32B 2457/00; B32B 2307/536; B32B 2250/40; B32B 2307/732; B32B 2307/54; B32B 2250/05; B32B 2307/30; B32B 2307/308; B32B 2307/538; B32B 5/16; B32B 5/30; B32B 9/048; B32B 2266/045; B32B 2311/12; B23K 1/00–206; B23K 35/302; B23K 2103/12; B23K 2103/16–172

USPC ........... 228/121–124.7, 262.6–262.61, 235.2
See application file for complete search history.

(56) References Cited

U.S. PATENT DOCUMENTS

| | | | | |
|---|---|---|---|---|
| 4,763,828 | A * | 8/1988 | Fukaya | C04B 37/026 228/124.1 |
| 5,153,077 | A * | 10/1992 | Kashiba | C04B 37/026 257/E23.006 |
| 5,686,190 | A | 11/1997 | Mennucci et al. | |
| 6,022,426 | A | 2/2000 | Mennucci et al. | |
| 6,113,761 | A | 9/2000 | Kardokus et al. | |
| 6,745,930 | B2 * | 6/2004 | Schmitt | B23K 35/001 228/122.1 |
| 7,686,205 | B2 * | 3/2010 | Okamoto | B23K 20/2333 228/122.1 |
| 7,963,435 | B2 * | 6/2011 | Sato | B23K 20/02 228/225 |
| 7,967,185 | B2 * | 6/2011 | Sato | B32B 37/12 228/234.1 |
| 7,980,448 | B2 * | 7/2011 | Sato | B32B 37/00 228/225 |
| 9,504,144 | B2 * | 11/2016 | Terasaki | B23K 35/32 |
| 9,833,855 | B2 * | 12/2017 | Terasaki | C04B 37/026 |
| 10,052,713 | B2 * | 8/2018 | Sato | B23K 20/002 |
| 10,211,068 | B2 * | 2/2019 | Oi | H01L 21/4882 |
| 2009/0115022 | A1 | 5/2009 | Nakashiba et al. | |
| 2009/0152237 | A1 * | 6/2009 | Chiang | C04B 37/025 216/33 |
| 2011/0079418 | A1 | 4/2011 | Furuichi et al. | |
| 2011/0311834 | A1 | 12/2011 | Hanafusa | |
| 2012/0032517 | A1 | 2/2012 | Ido et al. | |
| 2012/0273948 | A1 | 11/2012 | Su et al. | |
| 2014/0111956 | A1 * | 4/2014 | Taniguchi | B23K 35/02 361/771 |
| 2016/0167170 | A1 * | 6/2016 | Terasaki | C22C 9/02 219/121.61 |

FOREIGN PATENT DOCUMENTS

| | | |
|---|---|---|
| CN | 102760722 | 10/2012 |
| CN | 103819214 | 5/2014 |
| CN | 204204831 | 3/2015 |
| WO | WO-2013/015355 | 1/2013 |

OTHER PUBLICATIONS

International Search Report for Application No. PCT/EP2016/079879, dated Feb. 22, 2017, pp. 1-4.
1$^{st}$ Office Action issued by the European Patent Office dated Jun. 13, 2019 with respect to parallel European Patent Application No. 16 816 594.2-1101.
Chinese Office Action, Application No. 201680068701.6, dated Aug. 3, 2020.

* cited by examiner

US 10,988,418 B2

COPPER-CERAMIC SUBSTRATE, COPPER PRECURSOR FOR PRODUCING A COPPER-CERAMIC SUBSTRATE AND PROCESS FOR PRODUCING A COPPER-CERAMIC SUBSTRATE

CROSS-REFERENCE TO RELATED APPLICATIONS

The present application is the U.S. National Stage Application of International Patent Application No. PCT/EP2016/079879, filed on Dec. 6, 2016, which claims priority to German Patent Application No. 10 2015 224 464.4, filed on Dec. 7, 2015.

DESCRIPTION

The invention relates to a copper ceramic substrate having the features of the preamble of claim 1, to a copper semi-finished product for producing a copper ceramic substrate that has the features of the preamble of claim 7 or 9, and to a method for producing a copper ceramic substrate that has the features of the preamble of claim 13.

Copper ceramic substrates (e.g. DCB, AMB) are used for producing electronic power modules, for example, and are a composite made of a ceramic carrier and copper layers arranged either on one face or on both faces thereof. The copper layers are prefabricated as a copper semi-finished product in the form of a copper sheet that usually has a thickness of 0.1 to 1.0 mm, and are joined to the ceramic carrier by means of a joining method. Joining methods of this kind are also known as DCB (direct copper bonding) or AMB (active metal brazing). If the ceramic carrier has a high strength, however, copper layers which have an even greater thickness can also be applied, which is a fundamental advantage with regard to electrical and thermal properties.

The top drawing in FIG. 1 shows a copper ceramic substrate 1 according to the prior art, which comprises a ceramic carrier 2 that has two copper layers 3 and 4 arranged on the different faces, a structure made of conductor paths also having been etched into the copper layer 3 (the upper layer in the drawing), while the copper layer 4 (the lower layer in the drawing) is formed over the entire surface.

Ceramic plates made of mullite, $Al_2O_3$, $Si_3N_4$, AlN, ZTA, ATZ, $TiO_2$, $ZrO_2$, MgO, CaO, $CaCO_3$ or a mixture of at least two of these materials, for example, are used as ceramic carriers.

The copper layers are thereby joined to the ceramic base in the DCB method by means of the following method steps:
oxidising the copper layer such that an even copper oxide layer is produced;
placing the copper layer on the ceramic carrier;
heating the composite to a process temperature of between 1060° C. and 1085° C.

This produces a eutectic melt on the copper layer, which produces an integral join to the ceramic carrier. This process is referred to as bonding. A thin Cu—Al spinel layer results from joining if $Al_2O_3$ is used as the ceramic carrier.

Following the bonding process, the necessary conductor paths are structured by etching the surface of the copper layer that faces the exterior, i.e. the free surface. The chips are subsequently soldered and, by means of applying bonding wires, joins are produced to form contacts on the chip upper faces, for which the structure of the free surface of the copper layer should be as homogenously and finely structured as possible. To produce power modules, the copper ceramic substrate can subsequently also be joined to a base plate.

The advantages of the described copper ceramic substrate primarily include the high current load capacity of the copper, and good electrical insulation and mechanical support from the ceramic carrier. High adhesiveness of the copper layer to the ceramic carrier can also be achieved by means of DCB technology. Moreover, the copper ceramic substrates used are stable at a high ambient temperature, which is often present when said substrates are in use.

The weak point of the copper ceramic substrates is what is referred to as the thermal fatigue resistance, which is a material characteristic that describes the failure of a component after a determined number of temporary thermally induced stresses. This parameter is important for the lifetime of the power module, since extreme temperature gradients are produced during operation of the module. As a result of the different thermal expansion coefficients of the ceramic and copper materials used, mechanical stresses are thus thermally induced in the copper ceramic substrate during use, and this, after a certain number of cycles, can lead to delamination of the copper layer from the ceramic layer and/or to fissures in the ceramic layer and/or in the copper layer and thus to failure of the component. The bending of the copper ceramic substrate 1 caused by thermal stress is shown in the bottom drawing of FIG. 1 excessively. The different expansion of the copper layers 3 and 4, as a result of the different copper amounts, thereby causes the copper ceramic substrate to bend. As a result of this bend in the copper ceramic substrate 1, shear, compressive and tensile stresses are produced in the copper layers 3 and 4 themselves and in particular in the joins of the copper layers 3 and 4 to the ceramic carrier 2, which stresses can lead to the joins between the copper layers 3 and 4 and the ceramic carrier 2 breaking and to fissures in the copper layers 3 and 4 and/or in the ceramic carrier 2.

Against this background, the problem addressed by the present invention is that of creating a copper ceramic substrate and a copper semi-finished product which can be adjusted in an improved manner with regard to the various requirements placed on the copper layer and the substrate. A further problem addressed by the invention is that of creating a cost-effective method for producing a copper ceramic substrate of this kind.

In order to solve this problem, a copper ceramic substrate having the features of claim 1, a copper semi-finished product having the features claim 5 or claim 7, and a method having the features of claim 11 are proposed. Further preferred developments are found in the dependent claims that are dependent thereon, the drawings and the associated description.

According to the basic concept of the invention, it is proposed that the copper layer comprises at least one first layer, which faces the ceramic carrier and has an average first grain size, and a second layer, which is arranged on the face of the copper layer facing away from the ceramic carrier and has an average second grain size, the second grain size being smaller than the first grain size, and the copper layer in the first layer having an average grain size of greater than 100 µm, preferably approximately 250 to 1000 µm, and in the second layer having an average grain size of less than 100 µm, preferably approximately 50 µm, or the first layer having an average grain size of greater than 150 µm, preferably approximately 250 to 2000 µm, and the second layer having an average grain size of less than 150 µm, preferably approximately 50 µm.

The advantage of the proposed solution is that the copper layer can, as a result of the proposed different grain sizes of the structure of the two layers, be designed so as be considerably more suited to the requirements placed on the copper layer. One particular advantage of this is that the copper layer has a larger average grain size in the first layer, since the copper layer has an improved thermal fatigue resistance as a result of the larger grain size and the proof stress that is lower as a result, such that the likelihood of delamination or fissures being produced can be reduced. The relationship between proof stress and grain size is described in the Hall-Petch relationship:

$$\sigma_y = \sigma_0 + \frac{K}{\sqrt{d_K}}$$

where $\sigma_y$ is the proof stress, $\sigma_0$ and K are constants depending on the material, and dK is the grain size.

However, the copper layer has a second layer which has a finer grain size on the face that is directed towards the exterior and faces away from the ceramic carrier, as a result of which the copper layer on this face has a higher hardness level, strength level and proof stress, which is in turn advantageous for fields of application involving high loads (such as vibrations). Furthermore, a finer grain structure is advantageous for further processing by optical systems. During the processing procedure (e.g. etching process) for creating the conductor structure, fine grain sizes are also preferable, since sharp edges and finer structures can be better created as a result. In this instance, coarse grains would lead to deep etching craters along the grain boundaries, which would increase the roughness of the copper surface. This also gives the visual impression of fine grain sizes being homogenous. Furthermore, a fine structure on the surface is advantageous for bonding wires.

Overall, by using the solution according to the invention, a copper ceramic substrate can be created that has a high thermal fatigue resistance at the same time as having good workability, high strength and the free surface of the copper layer having high-quality visual properties.

In any case, the requirements placed on the copper layer can be considerably better met by the different grain sizes of the two layers than was possible until now using a copper layer that has a consistent grain size. The copper layer can thus be individually optimised to the imposed requirements, by choosing the grain sizes in the two layers within certain limits, without the optimisation with regard to one of the properties necessarily having an adverse influence on one of the other properties. In practice, the grain size is used as a characteristic variable, by means of which the properties of the copper layer can also be improved by deliberately using the same material with regard to the different requirements to be met.

In this case, a further thin third layer which has a finer particle structure can also certainly be provided between the first layer and the ceramic carrier, without departing from the concept of the invention as a result. It is only important that the first layer, which faces the ceramic carrier with respect to the second layer, has the coarser grain structure. In this case, the first layer is arranged between the second and the third layer and forms, in practice, the core of the copper layer, and is therefore decisive for the deformation behaviour of the substrate under thermal stress. In this case, the advantage of the invention is also utilised, since the bend in the copper layer caused by the coarser grain structure of the first copper layer and the stresses in the copper layer related thereto are also reduced, although the first layer does not rest directly on the ceramic carrier, but is instead separated from the ceramic carrier by the third layer. It is only important that the first layer is thick enough that it positively influences and in particular reduces the material stresses in the copper layer caused by the thermal stress.

The different structures in the copper layer can, for example, be achieved particularly simply by means of a specific heat treatment of the copper layer. Alternatively, at least two different copper materials having different grain sizes can also be joined to one another to form a copper layer, for example by means of plating. In this case, the different copper materials in the form of prefabricated bands can be joined to one another in a preceding process step to form a copper semi-finished product. Alternatively, the first layer that has the larger grain size can also first be applied to the ceramic carrier and the second layer that has the finer grain size can subsequently be applied to the first layer that has the larger grain size.

Furthermore, two different copper materials that have identical or any given grain sizes can also be joined to one another, the high temperature properties of which materials are adjusted such that, during heat treatment, a structure that has a large grain size is produced in the first layer and a structure that has a smaller grain size is produced in the second layer. Ideally, the bonding process in the DCB or AMB method itself can be used for the high temperature treatment. In this case, the different structure on the two faces can be achieved by a combination of using two different copper materials in conjunction with a special heat treatment.

In this case, it is also proposed that the copper material of the first layer is Cu-ETP, and the copper material on the face facing the exterior, in the second layer, is Cu-OF, more preferably Cu-OFE. On a solidification diagram, Cu-OF and Cu-OFE in particular have a distinct step-like melting point, i.e. it solidifies and melts abruptly when it goes below or above the melting temperature. Cu-ETP comprises portions of Cu oxide, which leads to the Cu-ETP solidifying or melting within a melting range that slopes downwards on the solidification diagram. Since the melting point of Cu-OF is higher than the solidus temperature of Cu-ETP, all of the Cu-OF is still solidified while the Cu-ETP melts. The advantage of using Cu-ETP as a first layer is that, when the solidus temperature of the Cu-ETP is exceeded, which temperature corresponds to the bonding temperature of the DCB method, the copper layer thus begins to melt in the region of the first layer in order to create the join to the ceramic carrier, while the free surface of the copper layer that is formed by the Cu-OF is still completely solidified. As a result of the Cu oxide melting onto the Cu-ETP, an improved join and adhesive strength in particular between the first copper layer and the ceramic carrier can be achieved. Furthermore, during the subsequent cooling, the Cu-ETP forms a coarser grain structure than that of the Cu-OF of the free surface, as a result of which the improved thermal fatigue resistance is automatically achieved according to the principle described above.

The invention is described in greater detail below with reference to a preferred embodiment. In the drawings, in detail:

Power modules are semiconductor devices of power electronics and are used as semiconductor switches. They contain a plurality of power semiconductors (chips) in a housing, which are electrically insulated from the heat sink. These are applied to a metallised surface of an electrically insulating plate (e.g. made of ceramic) by means of soldering or adhesive bonding, so as to ensure the heat output towards the base plate and also ensure the electrical insulation. The composite made of metallised layers and the insulating plate is referred to as a copper ceramic substrate and is created on an industrial scale by means of what is referred to as DCB technology (direct copper bonding).

Contact between the chips is established by means of bonds that have thin bonding wires. Moreover, further assemblies which have different functions (e.g. sensors, resistors) can be present and integrated.

To produce a DCB substrate, ceramic carriers (e.g. $Al_2O_3$, $Si_3N_4$, AlN, ZTA, ATZ) are joined to one another on the upper and lower faces thereof by copper layers in a bonding process. In preparation for this process, the copper layers can be oxidised (e.g. chemically or thermally) on the surface before being placed on the ceramic carrier, and can be subsequently placed on the ceramic carrier. The join is produced in a high temperature process between 1060° C. and 1085° C., a eutectic melt being produced on the surface of the copper layer, which melt produces a join to the ceramic carrier. For example, in the case of copper (Cu) on aluminium oxide ($Al_2O_3$), this join consists of a thin Cu—Al spinel layer.

Figure 1:
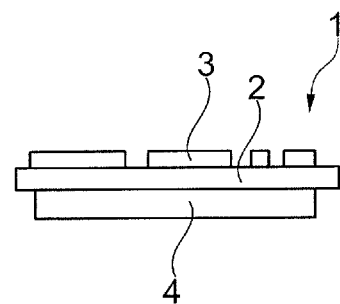
FIG. 1 shows a copper ceramic substrate according to the prior art.
Figure 1:
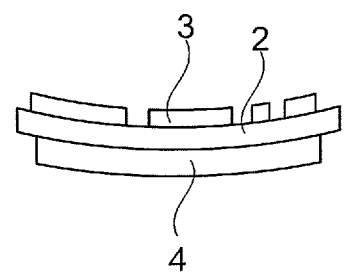

FIG. 1 shows a copper ceramic substrate 1 according to the prior art, which comprises a ceramic carrier 2 and two copper layers 3 and 4 held on the surface of the ceramic carrier 2.

Figure 3:
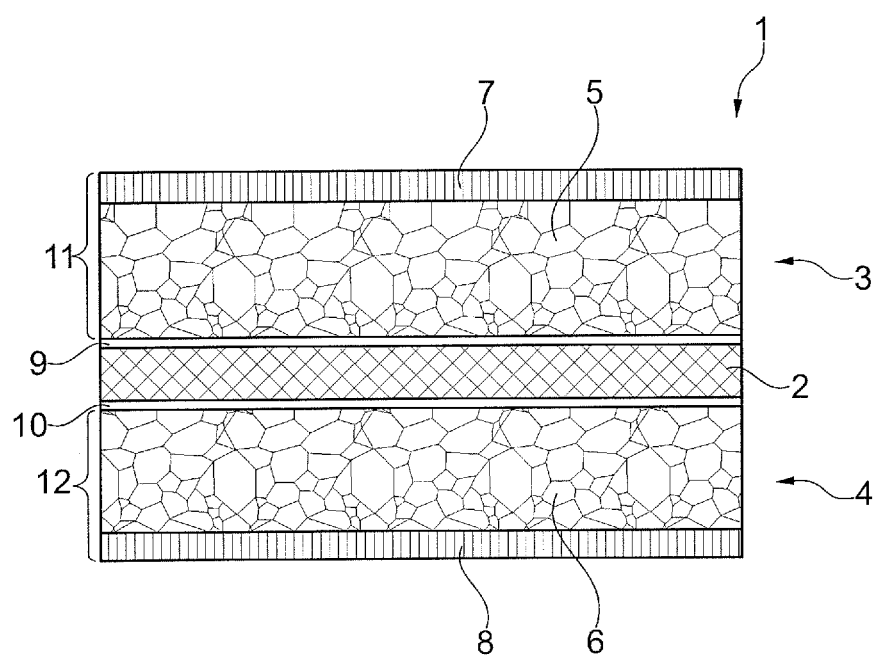
FIG. 3 is a sectional view of a copper ceramic substrate according to the invention.

FIG. 3 shows a copper ceramic substrate 1 that has been developed according to the invention and comprises a ceramic carrier 2 and two copper layers 3 and 4. The two copper layers 3 and 4 in FIG. 3, which have been developed according to the invention, each comprise a first layer 5 and 6 that faces the ceramic carrier 2 and has a coarser microstructure. The first layers 5 and 6 are preferably those layers with which the copper layers 3 and 4 rest against the ceramic carrier 2, and which form the join to the ceramic carrier 2.

The first layers 5 and 6 of the copper layers 3 and 4 are each covered, on the free outer face, by a second layer 7 and 8 that has a finer microstructure having an average finer grain size of less than 100 or 150 µm, preferably of approximately 50 µm. However, the first layers 5 and 6 of the two copper layers 3 and 4 have a coarser microstructure that has an average larger grain size of greater than 100 or 150 µm, preferably of approximately 250 to 1000 µm or 250 to 2000 µm. The microstructures of the copper layers 3 and 4 thus have, in the first layers 5 and 6 that face the ceramic carrier 2, a grain size that is on average 10 times greater than the grain size in the layers 7 and 8 that are directed outwards. The first layers 5 and 6 can be substantially thicker than the second layers 7 and 8 and form the base layers of the copper layers 3 and 4. The second layers 7 and 8 can be substantially thinner, have a thickness of approximately 50 to 100 µm, and form the free surfaces of the copper layers 3 and 4. As a result of the considerably greater thickness of the first layers 5 and 6 which have the larger grain size, the mechanical behaviour of the copper layers 3 and 4 is changed to such an extent that the copper layers 3 and 4 have, overall, a lower proof stress and thus a higher thermal fatigue resistance, while the second layers 7 and 8, which have the substantially finer microstructure, merely form the free surface.

The copper layers 3 and 4 can, for example, be joined to the ceramic carrier 2 after the DCB method described at the outset such that the two first layers 5 and 6 of the two copper layers 3 and 4 that rest thereon are joined to the ceramic carrier 2 by means of an integral join in the respective surface edge zones 9 and 10 of the ceramic carrier 2. Since the two copper layers 3 and 4 in the first layers 5 and 6 have a considerably coarser microstructure that has a large grain size of 250 to 1000 µm or 250 to 2000 µm, they also have, as a result of the Hall-Petch relationship described above, a lower proof stress than in the region of the second layers 7 and 8 arranged on the outer faces, and therefore are joined to the ceramic carrier 2 at a higher thermal fatigue resistance than would be the case if they had the same grain size of 50 µm on this face as on the outer face. Thus, the copper layers 3 and 4 that are formed by means of the proposed design and have the larger grain size on the face of the join to the ceramic carrier 2 are specially designed for a high thermal fatigue resistance in the join between the surface edge zones 9 and 10. In contrast, the copper layers 3 and 4 on the outer faces thereof, as a result of the finer microstructure of the second layers 7 and 8 that have the finer grain size of 50 µm, are considerably more simply and precisely processed for introducing the conductor structure. Moreover, the layers on this face have a greater hardness, strength and proof stress, such that the lifetime of the copper ceramic substrate 1 can also be increased with respect to external influences. Furthermore, the finer-grained structure of the second layers 7 and 8 that form the surface is advantageous for joining wires.

Figure 2:
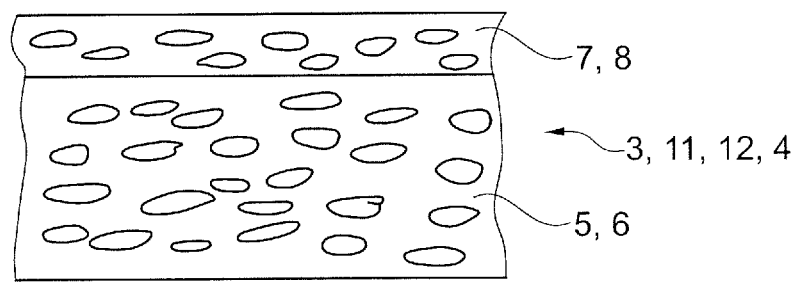
FIG. 2 shows a copper semi-finished product comprising two layers made of different copper materials.

The different microstructure of the copper layers 3 and 4 in the different layers 5, 6, 7 and 8 can be achieved by means of a specifically undertaken heat treatment or by means of using two different copper materials or by means of a combination of the two measures. According to a preferred embodiment, the two copper layers 3 and 4 are produced by means of plating (such as roll-bonding) a layer of the copper material Cu-OF, preferably Cu-OFE, with a layer of the copper material Cu-ETP to form a copper semi-finished product 11 and 12, which is shown in FIG. 2. The first layer 5, 6, formed by the Cu-ETP, and the second layer 7, 8, formed by the Cu-OF, here have an identical or at least comparable grain size. During the DCB method, the preoxidised copper semi-finished product 11 or 12 is placed on the ceramic carrier 2, for example, and then heated to the process temperature of 1060° C. to 1085° C. In so doing, the Cu oxide in the first layer 5, 6, which in this case is formed by the Cu-ETP, melts and forms the joins to the ceramic carrier 2 in the surface edge zones 9 and 10. As a result of the application of heat and the different recrystallisation behaviour of the two copper materials, the structure is changed to such an extent that the particles in the Cu-ETP are subsequently coarse, while the Cu-OF or the Cu-OFE has a finer microstructure.

Cu-OF or Cu-OFE and Cu-ETP are highly conductive Cu materials and have a conductivity of greater than or equal to 58 MS/m. However, materials which have a lower conductivity are also conceivable. Furthermore, the two Cu materials can also be joined to one another by means of other joining methods, such as welding, soldering, stapling, adhesive bonding or additive manufacturing methods. Furthermore, the copper layers 3 and 4 can, if required, also be supplemented by further Cu materials or layers, provided that the material properties of the copper layers 3 and 4 are intended to be further refined.

The two copper layers 3 and 4 are preferably prefabricated as copper semi-finished products 11 and 12, in each case by plating the two Cu materials. After bonding, the copper semi-finished products 11 and 12 already have, as a result of the proposed use of different Cu materials and applying heat during bonding, a microstructure on one face that has a finer grain size of approximately 50 μm and a microstructure on the other face that has a larger grain size of 250 to 1000 μm. In this case, the bonding simultaneously deliberately constitutes a heat treatment, during which the grains of the first layers 5 and 6 of the copper layers 3 or 4, which face the ceramic carrier 2, increases further in size, and this in turn is positive in the sense of a further increased thermal fatigue resistance of the copper layers 3 and 4 and in particular in the region of the joins 9 and 10 to the ceramic carrier 2. At the same time, the heat treatment does not lead to a noteworthy increase in the grain size in the layers 7 and 8 of the copper layers 3 or 4 or of the copper semi-finished product 11 and 12 that face away from the ceramic carrier 2, such that the properties of the copper layers 3 and 4 on this face are not disadvantageously changed.

According to one embodiment, two different Cu materials are joined to one another by means of plating, such that the high temperature properties in the finished material can be specifically set such that a coarse structure having low proof stress is produced in the copper layers 3 and 4 during the application of heat on the faces facing the ceramic carrier 2 and such that a finer structure having the required surface properties is produced on the free surface. In so doing, further layers which also have a finer structure can also be present between the first layers 5 and 6, which have the coarser structure, and the ceramic carrier 2, provided that this is advantageous for the specific application. However, the main advantage of the reduction in the formation of fissures and prevented delamination under thermal fatigue stress remains, since the first layers 5 and 6 of the copper layers 3 and 4 in this case also form a core which has a reduced proof stress and a thereby increased thermal fatigue resistance.

Furthermore, the bonding is also used in this case, preferably alongside the creation of the join, as a heat treatment, by means of which it is particularly simple to achieve the different grain sizes proposed according to the invention on the two faces of the copper layers 3 and 4, it being possible to further improve the effect by using the two different copper materials.

The copper layers 3 and 4 are preferably prefabricated as copper semi-finished products 11 and 12, which are produced by plating the two proposed copper materials. In so doing, the first layers 5 and 6, which are facing the ceramic carrier 2 and are formed by the Cu-ETP, are designed so as to be substantially thicker and so as to form a type of carrier function for the substantially thinner second layers 7 and 8, formed by the Cu-OF.

The copper semi-finished products 11 and 12 can have a thickness of 0.1 to 1.0 mm, are placed in large dimensions on the ceramic carrier 2, and are joined to the ceramic carrier 2 by means of the DCB method. Subsequently, the large-surface-area copper ceramic substrate 1 is cut into smaller units and further processed.

Alongside the improved copper ceramic substrate 1 and the copper sheets which are prefabricated as copper semi-finished products 11 and 12, the invention also provides a preferable cost-effective method for producing the copper ceramic substrate 1. In this method, the proposed copper ceramic substrate 1 is preferably produced by means of a heat treatment, by means of which the different grain sizes in the two layers 5 and 6 or 7 and 8 are automatically adjusted. In this case, the copper layers 3 and 4 can be subjected to the heat treatment before being joined to the ceramic carrier 2, or the application of heat can be used during the bonding method in order to influence the microstructure. Furthermore, the copper layers 3 and 4 can also be put together by plating two different Cu materials which already have a different microstructure or which then form the different microstructures during the heat treatment.

Embodiment 1

Copper ceramic substrate (1) comprising
a ceramic carrier (2), and
a copper layer (3, 4) joined to a surface of the ceramic carrier (2), characterised in that
the copper layer (3, 4) comprises at least one first layer (5, 6), which faces the ceramic carrier and has an average first grain size, and a second layer (7, 8), which is arranged on the face of the copper layer (3, 4) facing away from the ceramic carrier (2) and has an average second grain size,
the second grain size being smaller than the first grain size, and
the first layer (5, 6) having an average grain size of greater than 100 μm, preferably approximately 250 to 1000 μm, and
the second layer (7, 8) having an average grain size of less than 100 μm, preferably approximately 50 μm, or
the first layer (5, 6) having an average grain size of greater than 150 μm, preferably approximately 250 to 2000 μm, and
the second layer (7, 8) having an average grain size of less than 150 μm, preferably approximately 50 μm.

Embodiment 2

Copper ceramic substrate (1) according to Embodiment 1, characterised in that
the first and the second layer (5, 6, 7, 8) of the copper layer (3, 4) are formed by at least two different copper materials.

Embodiment 3

Copper ceramic substrate (1) according to Embodiment 2, characterised in that
the copper material of the first layer (5, 6) is Cu-ETP.

Embodiment 4

Copper ceramic substrate (1) according to either Embodiment 2 or Embodiment 3, characterised in that
the copper material of the second layer (7, 8) is Cu-OF, more preferably Cu-OFE.

Embodiment 5

Copper ceramic substrate (1) according to any of the preceding Embodiments, characterised in that
the first layer (5, 6) has a lower proof stress than the second layer (7, 8).

Embodiment 6

Copper ceramic substrate (1) according to any of the preceding Embodiments, characterised in that
the first layer (5, 6) has a melting point of 1060° C. to 1085° C.

Embodiment 7

Copper semi-finished product (11, 12) for producing a copper ceramic substrate (1), characterised in that the copper semi-finished product (11, 12) comprises at least one first layer (5, 6) that has an average first grain size and a second layer (7, 8) that has an average second grain size, the two average grain sizes being different, the first layer (5, 6) having an average grain size of greater than 100 μm, preferably approximately 250 to 1000 μm, and the second layer (7, 8) having an average grain size of less than 100 μm, preferably approximately 50 μm, or the first layer (5, 6) having an average grain size of greater than 150 μm, preferably approximately 250 to 2000 μm, and the second layer (7, 8) having an average grain size of less than 150 μm, preferably approximately 50 μm.

Embodiment 8

Copper semi-finished product (11, 12) according to Embodiment 7, characterised in that
the two layers (5, 6, 7, 8) are formed by different copper materials.

Embodiment 9

Copper semi-finished product (11, 12) for producing a copper ceramic substrate (1), characterised in that
the copper semi-finished product (11, 12) comprises a first layer (5, 6) made of a first copper material and a second layer (7, 8) made of a second copper material,
the first and the second copper material being designed so as to have different grain sizes after an application of heat.

Embodiment 10

Copper semi-finished product (11, 12) according to either Embodiment 8 or Embodiment 9, characterized in that
the two different copper materials are joined to one another by means of plating.

Embodiment 11

Copper semi-finished product (11, 12) according to any of Embodiments 8 to 10, characterized in that
the two different copper materials are Cu-OF, preferably Cu-OFE, and Cu-ETP.

Embodiment 12

Copper semi-finished product (11, 12) according to any of Embodiments 7 to 11, characterized in that
the copper semi-finished product (11, 12) undergoes different heat treatments in the two layers (5, 6, 7, 8).

Embodiment 13

Method for producing a copper ceramic substrate (1) having the features of any of Embodiments 1 to 6, characterised in that
the different grain sizes of the two layers (5, 6, 7, 8) of the copper layer (3, 4) are achieved by applying heat during a bonding method for joining the copper layer (3, 4) to the ceramic carrier (2).

Embodiment 14

Method according to Embodiment 13, characterised in that the copper layer (3, 4) is formed by a copper semi-finished product (11, 12) according to Embodiment 7 or according to any of Embodiments 8 to 12 when dependent on Embodiment 7.

The invention claimed is:
1. A copper ceramic substrate, comprising:
a ceramic carrier; and
a copper layer joined to a surface of the ceramic carrier, wherein the copper layer comprises:
    at least one first layer;
    wherein the at least one first layer faces the ceramic carrier and has a first average grain size, and
    a second layer;
    wherein the second layer is arranged on a face of the copper layer facing away from the ceramic carrier and has a second average grain size,
    wherein the second average grain size is smaller than the first average grain size, and
    wherein:
        a) the first average grain size is in a range of from 250 μm to 1000 μm, and the second average grain size is less than 100 μm; or
        b) the first average grain is in a range of from 250 μm to 2000 μm, and the second average gram size is less than 150 μm.
2. The copper ceramic substrate according to claim 1, wherein the at least one first layer and the second layer of the copper layer are formed of at least two different copper materials.
3. The copper ceramic substrate according to claim 2, wherein the at least one first layer is formed of Cu-ETP.
4. The copper ceramic substrate according to claim 3, wherein the second layer is formed of Cu-OF or Cu-OFE.
5. The copper ceramic substrate according to claim 1, wherein the at least one first layer has a first proof stress, wherein the second layer has a second proof stress, and wherein the first proof stress is lower than the second proof stress.
6. The copper ceramic substrate according to claim 1, wherein the at least one first layer has a melting point of 1060° C. to 1085° C.
7. A method for producing a copper ceramic substrate, comprising:
providing a ceramic carrier;
providing at least one first layer;
providing a second layer,
wherein the at least one first layer and the second layer are formed of copper materials,
joining the at least one first layer and the second layer together to form a copper semi-finished product,
bonding the copper semi-finished product to a surface of the ceramic carrier to form a copper ceramic substrate,
wherein the copper ceramic substrate comprises:
    a copper layer joined to the surface of the ceramic carrier,
    wherein the copper layer comprises:
        the at least one first layer; and
        wherein the at least one first layer faces the ceramic carrier and has a first average grain size;
        the second layer;
        wherein the second layer is arranged on a face of the copper layer facing away from the ceramic carrier,
        wherein the second layer has a second average grain size,
        wherein the second average grain size is smaller than the first average grain size,
    wherein a difference between the first average grain size and the second average grain size is achieved by:

(i) joining the at least one first layer and the second layer together when the at least one first layer and the second layer have different average grain size;
(ii) applying heat to the at least one first layer and the second layer after joining the at least one first layer and the second layer together, and prior to bonding the copper semi-finished product to the surface of the ceramic carrier;
(ii) applying heat to the at least one first layer and the second layer during bonding the copper semi-finished product to the surface of the ceramic carrier;
(i) and (ii);
(i) and (iii);
(ii) and (iii); or
(i), (ii), and (iii), and
wherein:
   a) the first average grain size is in a range of from 250 μm to 1000 μm, and the second average grain size is less than 100 μm; or
   b) the first average grain size is in a range of from 250 μm to 2000 μm, and the second average grain size is less than 150 μm.

8. The method according to claim 7,
wherein joining the at least one first layer and the second layer together is accomplished via plating.

9. The method according to claim 7,
wherein the second average grain size is approximately 50 μm.

10. The copper ceramic substrate according to claim 1,
wherein the second average grain size is approximately 50 μm.

* * * * *